W. KLINE.
PNEUMATIC TIRE.
APPLICATION FILED APR. 23, 1919.

1,335,442.

Patented Mar. 30, 1920.

INVENTOR,
WALTER KLINE.
BY
ATTYS.

UNITED STATES PATENT OFFICE.

WALTER KLINE, OF MOGADORE, OHIO, ASSIGNOR TO THE INTERLOCKING CORD TIRE AND BELT COMPANY, OF AKRON, OHIO.

PNEUMATIC TIRE.

1,335,442.   Specification of Letters Patent.   Patented Mar. 30, 1920.

Application filed April 23, 1919. Serial No. 292,050.

*To all whom it may concern:*

Be it known that I, WALTER KLINE, a citizen of the United States, residing at Mogadore, in the county of Summit and State of Ohio, have invented certain new and useful Improvements in Pneumatic Tires, of which the following is a specification.

The present invention relates to improvements in pneumatic tire casings, particularly to an improved reinforcing structure between the inner and outer sheathings of the casing.

In my previously issued Letters Patent of January 8, 1918, No. 1,252,703, I have disclosed a tire construction embodying a so-called corded casing, which in practice has afforded a maximum degree of resiliency, at the same time preventing a separation of the cords, as in the ordinary cord casing, due to punctures, stone bruises and the like. The present disclosure embodies the same general characteristics as my aforesaid patent, and has for its primary object to improve somewhat on this patent and thus provide a stronger and a still more durable construction.

In the construction of my improved casing I prefer to employ the so-called cords in the form of what might be termed loosely woven tapes, having strong strands or tension members interwoven in their outermost edges. These cords are applied in two overlapping and interlocking layers in one general diagonal direction, and another similar pair of layers in the opposite diagonal direction.

For a more detailed description, reference should now be had to the accompanying drawings, in which—

Figure 1:
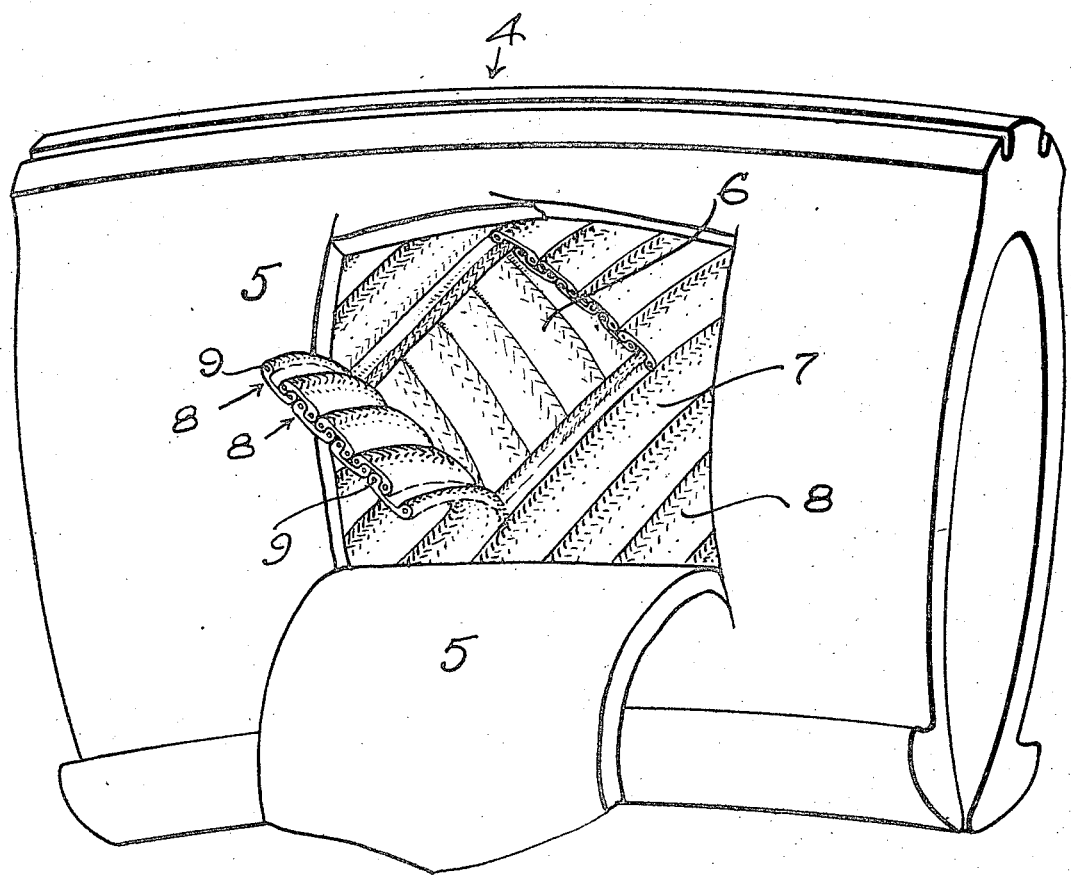
Figure 2:
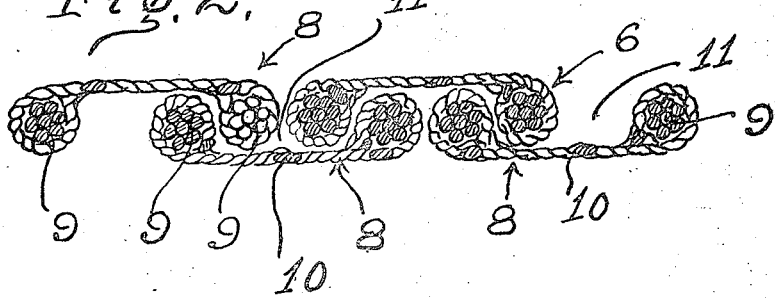

Figure 1 is a perspective view of a portion of my improved casing, having parts thereof cut away to show the interior construction; and Fig. 2 is an enlarged diagrammatic section of the cords, showing the manner of overlapping and interlocking.

In the preferred embodiment of my invention I employ a casing 4, having an inner sheathing (not shown in the drawing) and an outer sheathing 5, between which are placed two series of overlapping and interlocking cords; one series 6 lying next to the inner sheathing in one general diagonal direction, and the other series 7 lying next to the outer sheathing 5 and extending in a diagonal direction opposite the series 6.

In construction, series 6 and 7 are identical, hence I will describe only one series in detail. Each series is made up of two overlapping and interlocking layers of cords. These so-called cords are made up in the form of narrow, loosely woven tapes 8, having interwoven in their edges strong tension members 9. In the construction of the casing these cords 8 are applied first to the inner sheathing in a diagonal position, with their edges abutting, as clearly shown in Fig. 1 of the drawings, and as the cords are pulled down tight it will be found that the relatively thin web portion 10 of the cord will lie flat against the surface upon which it is wound, forming a depression 11 between the outstanding tension members 9 in the edges of the cords, as shown in Fig. 2.

Upon this first laid layer another layer of cords is placed, the web portions 11 of which are positioned across the abutting and outstanding edges of the cords first laid. It will now be seen that the tension members 9 in the edges of the last laid cords will lie in the depressions 11 of the first laid cords in such a manner as to interlock their edges and at the same time the first laid cords interlock the edges of the last laid cords.

It is, of course, understood that the cords may be embedded in rubber gum before applying.

I claim:

1. A tire casing embodying in its structure cords, each of which having tension members, connected by a relatively thin web portion, said cords being positioned with their web portions overlapping and their tension members interlocking.

2. A tire casing embodying in its structure two series of cords, one series extending in one diagonal direction and the other series extending in the opposite diagonal direction, each series consisting of cords having tension members connected by a relatively thin web portion, said cords being positioned with their web portions overlapping and their tension members interlocking.

3. A tire casing embodying in its structure cords, each of which having cable-like tension members, connected by a relatively thin web portion, said cords being positioned with their web portions overlapping and their tension members interlocking.

4. A tire casing embodying in its structure cords, each of which having tension members, comprising a plurality of twisted cords, connected by a relatively thin web portion, said cords being positioned with their web portions overlapping and their tension members interlocking.

WALTER KLINE.